(12) United States Patent
Ghose et al.

(10) Patent No.: US 11,392,444 B1
(45) Date of Patent: Jul. 19, 2022

(54) METHOD AND APPARATUS FOR ANALYSIS OF RUNTIME BEHAVIOR

(71) Applicant: Dell Products L.P., Round Rock, TX (US)

(72) Inventors: Chandroma Ghose, Bangalore (IN); Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/195,874

(22) Filed: Mar. 9, 2021

(51) Int. Cl.
*G06F 11/07* (2006.01)

(52) U.S. Cl.
CPC ........ *G06F 11/079* (2013.01); *G06F 11/0751* (2013.01); *G06F 11/0772* (2013.01)

(58) Field of Classification Search
CPC . G06F 11/079; G06F 11/0751; G06F 11/0772
See application file for complete search history.

(56) References Cited

U.S. PATENT DOCUMENTS

| | | | |
|---|---|---|---|
| 9,104,573 B1* | 8/2015 | Shanmugasundaram | G06F 11/079 |
| 10,901,831 B1* | 1/2021 | Jain | G06F 11/0706 |
| 2012/0066759 A1* | 3/2012 | Chen | G06F 21/554 726/15 |
| 2015/0081918 A1* | 3/2015 | Nowack | H04L 65/1006 709/227 |
| 2015/0326683 A1* | 11/2015 | Singh | G06F 9/54 709/203 |
| 2018/0278740 A1* | 9/2018 | Choi | G06F 3/04817 |
| 2020/0379805 A1* | 12/2020 | Porter | G06F 16/24568 |
| 2021/0225500 A1* | 7/2021 | Pronk | H04L 67/12 |

\* cited by examiner

*Primary Examiner* — Jigar P Patel
(74) *Attorney, Agent, or Firm* — Daly, Crowley Mofford & Durkee, LLP

(57) ABSTRACT

A method comprising: receiving a configuration file that identifies a plurality of first log patterns, each of the first log patterns being associated with a respective component of an application and a respective malfunction of the respective component of the application; retrieving, by an application monitor, one more execution logs that are generated while the application is being executed; identifying, by the application monitor, a malfunction of the application based on the configuration file and the one or more execution logs, the malfunction being identified in response to a given one of the plurality of first log patterns matching an execution log pattern that is identified in the one or more execution logs; and reporting, by the application monitor, the malfunction to a technical support system.

20 Claims, 8 Drawing Sheets

```
"Feature_ValidateInventory": [{
    "UI_Healthy": ["LogPattern23"],
    "UI_Unhealthy": ["LogPattern28", "LogPattern30"],
    "Background_Healthy": ["LogPattern26"],
    "Background_Unhealthy": ["LogPattern27"]
    "Rest_Healthy": ["LogPattern25"],
    "Rest_Unhealthy": ["LogPattern19", "LogPattern24"],
}],
```

500A

Going to invoke addAsset method in class ApplianceAssetService
Starting add Asset Task
Unable to add asset since group cannot be created
add Asset completed failure

Going to invoke addAsset method in class ApplianceAssetService
Starting add Asset Task
add Asset completed success

21 Jan 2021 11:50:42,173 [DS_ASSET_DISCOVERY-0] DEBUG com.dell.sae.inventory.framework.executors.DomainTaskMethodInvoker-207 - serviceClass :class com.dell.sae.inventory.domainservice.service.appliance.ApplianceAssetService 21 Jan 2021 11:50:42,176 [DS_ASSET_DISCOVERY-0] INFO com.dell.sae.inventory.framework.executors.DomainTaskMethodInvoker-56 - Going to invoke addAsset method in class ApplianceAssetService  ~602

21 Jan 2021 11:50:42,177 [DS_ASSET_DISCOVERY-0] DEBUG com.dell.sae.inventory.domainservice.service.appscommon.AppsCommonAssetService- 53 - Starting add Asset Task  ~602

21 Jan 2021 11:50:42,180 [DS_ASSET_DISCOVERY-0] DEBUG com.dell.sae.inventory.domainservice.service.appscommon.AppsCommonAssetService- 53 - Going to validate asset data 21 Jan 2021 11:50:42,182 [DS_ASSET_DISCOVERY-0] DEBUG com.dell.sae.inventory.domainservice.service.appscommon.AppsCommonAssetService- 53 - Going to validate groupId:1611244332047-5661316399141

21 Jan 2021 11:50:42,188 [DS_ASSET_DISCOVERY-0] DEBUG com.dell.sae.inventory.domainservice.service.appscommon.AppsCommonAssetService- 53 - Group Id validation failed because group cannot be created.

21 Jan 2021 11:50:42,192 [DS_ASSET_DISCOVERY-0] DEBUG com.dell.sae.inventory.domainservice.service.appscommon.AppsCommonAssetService- 53 - Unable to add asset since group cannot be created.  ~602

21 Jan 2021 11:50:42,195 [DS_ASSET_DISCOVERY-0] DEBUG com.dell.sae.inventory.domainservice.service.appscommon.AppsCommonAssetService- 53 - add Asset completed failure  ~602

FIG. 6A

```
24 Jan 2021 11:50:42,173 [DS_ASSET_DISCOVERY-0] DEBUG
com.dell.sae.inventory.framework.executors.DomainTaskMethodInvoker- 207 - serviceClass :class
com.dell.sae.inventory.domainservice.service.appliance.ApplianceAssetService
24 Jan 2021 11:50:42,176 [DS_ASSET_DISCOVERY-0] INFO
com.dell.sae.inventory.framework.executors.DomainTaskMethodInvoker- 56 –
Going to invoke addAsset method in class ApplianceAssetService          604
24 Jan 2021 11:50:42,177 [DS_ASSET_DISCOVERY-0] DEBUG
com.dell.sae.inventory.domainservice.service.appscommon.AppsCommonAssetService- 53 –
Starting add Asset Task         604
24 Jan 2021 11:50:42,180 [DS_ASSET_DISCOVERY-0] DEBUG
com.dell.sae.inventory.domainservice.service.appscommon.AppsCommonAssetService- 53 - Going to validate asset data
24 Jan 2021 11:50:42,182 [DS_ASSET_DISCOVERY-0] DEBUG
com.dell.sae.inventory.domainservice.service.appscommon.AppsCommonAssetService- 53 - Successfully validated all add asset
input data
24 Jan 2021 11:50:42,192 [DS_ASSET_DISCOVERY-0] DEBUG
com.dell.sae.inventory.domainservice.service.appscommon.AppsCommonAssetService- 53 - Successfully discovered asset using
credentials provided.
24 Jan 2021 11:50:42,195 [DS_ASSET_DISCOVERY-0] DEBUG
com.dell.sae.inventory.domainservice.service.appscommon.AppsCommonAssetService- 53 - add Asset completed success     604
```

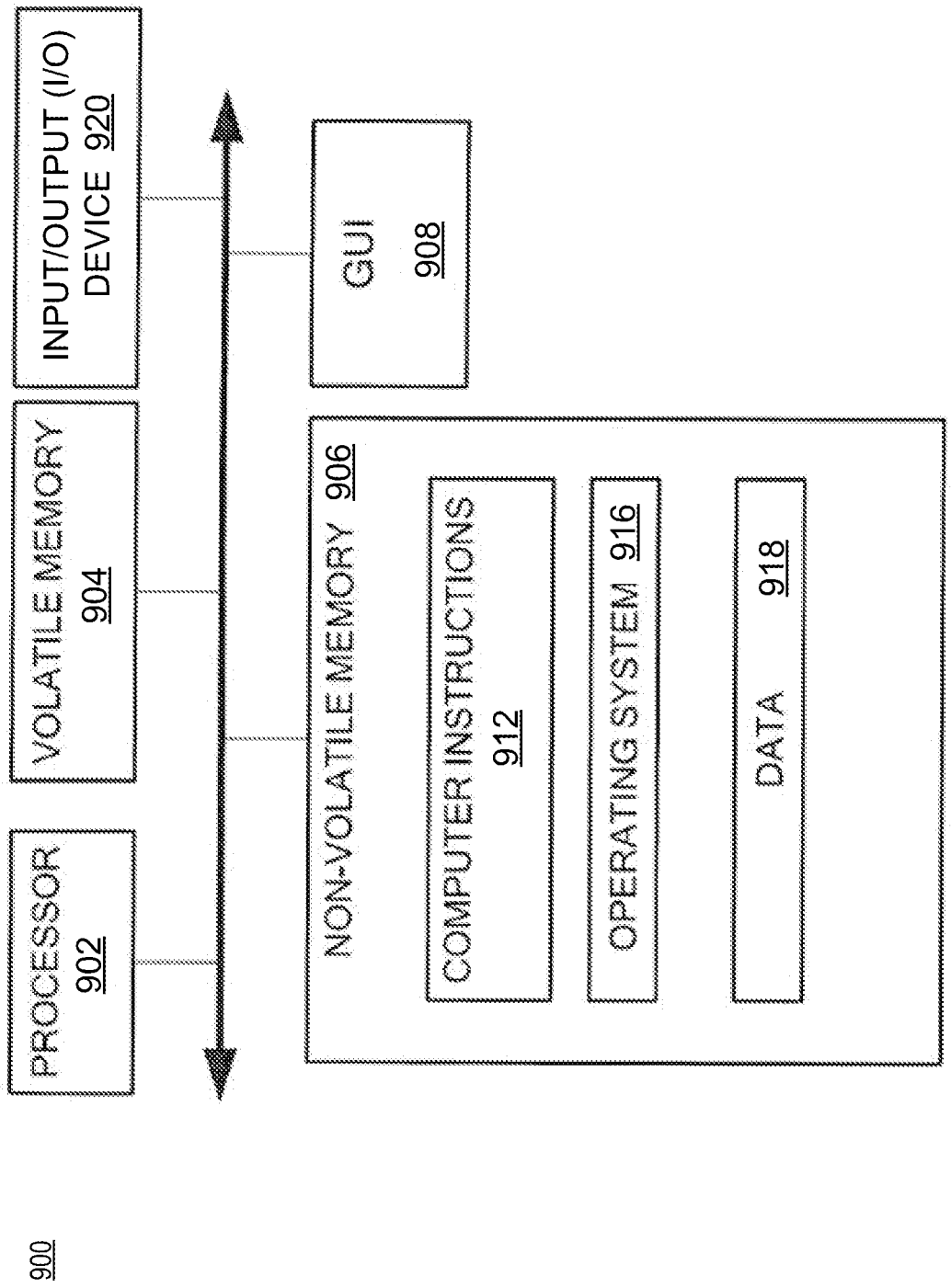

METHOD AND APPARATUS FOR ANALYSIS OF RUNTIME BEHAVIOR

BACKGROUND

When a software system experiences a failure, the failure may be reported to the provider of the software. The provider may then isolate the cause of the failure and remove it via a software update. Frequently, by the time a customer reports a software failure to the provider, the failure has existed for an extended period of time, without the customer noticing. Such delay in reporting the failure may increase the overall cost of addressing the failure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving a configuration file that identifies a plurality of first log patterns, each of the first log patterns being associated with a respective component of an application and a respective malfunction of the respective component of the application; retrieving, by an application monitor, one more execution logs that are generated while the application is being executed; identifying, by the application monitor, a malfunction of the application based on the configuration file and the one or more execution logs, the malfunction being identified in response to a given one of the plurality of first log patterns matching an execution log pattern that is identified in the one or more execution logs; and reporting, by the application monitor, the malfunction to a technical support system, wherein the application monitor is executed concurrently with the application on a same computing device, and the malfunction of the application is identified and reported while the application is being executed.

According to aspects of the disclosure, a system is provided, comprising: a memory; and at least one processor operatively coupled to the memory, the at least one processor being configured to perform the operations of: receiving a configuration file that identifies a plurality of first log patterns, each of the first log patterns being associated with a respective component of an application and a respective malfunction of the respective component of the application; retrieving, by an application monitor, one more execution logs that are generated while the application is being executed; identifying, by the application monitor, a malfunction of the application based on the configuration file and the one or more execution logs, the malfunction being identified in response to a given one of the plurality of first log patterns matching an execution log pattern that is identified in the one or more execution logs; and reporting, by the application monitor, the malfunction to a technical support system, wherein the application monitor is executed concurrently with the application on a same computing device, and the malfunction of the application is identified and reported while the application is being executed.

According to aspects of the disclosure, a non-transitory computer-readable medium is provided that stores one or more processor-executable instructions, which when executed by at least one processor cause the at least one processor the perform the operations of: receiving a configuration file that identifies a plurality of first log patterns, each of the first log patterns being associated with a respective component of an application and a respective malfunction of the respective component of the application; retrieving, by an application monitor, one more execution logs that are generated while the application is being executed; identifying, by the application monitor, a malfunction of the application based on the configuration file and the one or more execution logs, the malfunction being identified in response to a given one of the plurality of first log patterns matching an execution log pattern that is identified in the one or more execution logs; and reporting, by the application monitor, the malfunction to a technical support system, wherein the application monitor is executed concurrently with the application on a same computing device, and the malfunction of the application is identified and reported while the application is being executed.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5A is a diagram of an example of a log pattern, according to aspects of the disclosure;

FIG. 5B is a diagram of an example of a log pattern, according to aspects of the disclosure;

FIG. 6A is a diagram of an example of a test log, according to aspects of the disclosure;

FIG. 6B is a diagram of an example of a test log, according to aspects of the disclosure;

FIG. 9 is a diagram of an example of a computing device, according to aspects of the disclosure.

DETAILED DESCRIPTION

Figure 1:
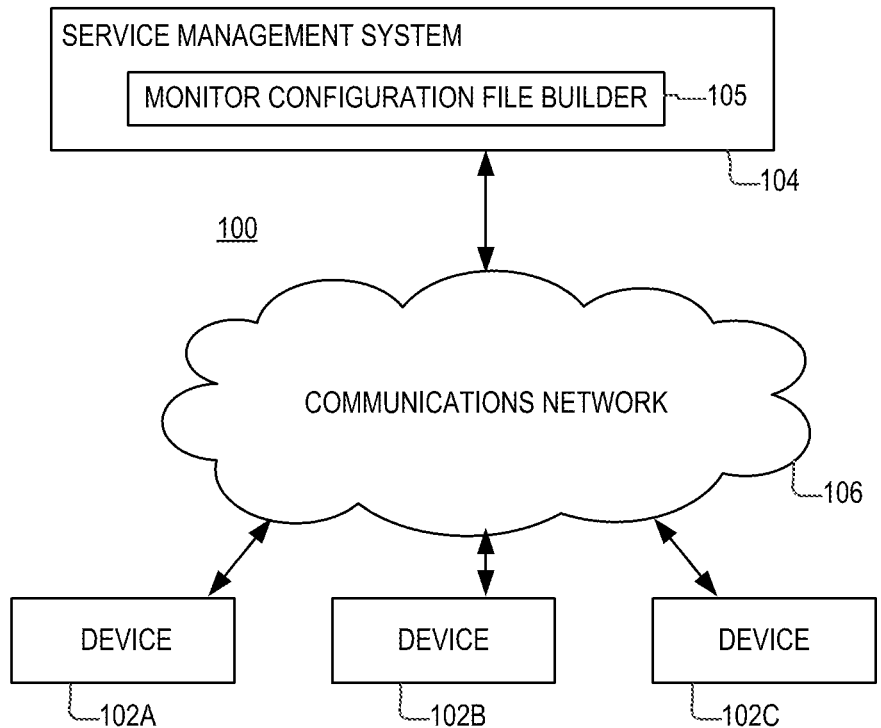
FIG. 1 is a diagram of an example of a system, according to aspects of the disclosure.

According to aspects of the disclosure, a technique for monitoring the health of application features (e.g., application components, etc.) is provided. According to the technique, telemetry generated by a software application may be continually monitored on the computing device on which the software application is running. The telemetry may be monitored while the software application is running. The telemetry may be streamed into one or more execution logs of the software application. The telemetry may be retrieved from the execution logs and compared to a set of log patterns, which are associated with known failures of the software application. When the telemetry matches any of the log patterns, a determination can be made that the software application has failed. Afterwards, the failure may be reported automatically to a service management system. The service management system may generate a customer support ticket for the failure, which can be handled in a well-known fashion by customer support personnel.

According to aspects of the disclosure, the set of log patterns may be generated based on test logs that are produced throughout the development cycle of the software application. Such test logs may be generated during development cycle testing of the software application, end-to-end or system integration testing of the software application, user acceptance testing for the software application, or final production environment testing of the software application. In some implementations, the set of log patterns may be generated by performing natural language processing (NLP) on the test logs.

The technique for monitoring the health of a software application allows malfunctions of the software application to be discovered and reported promptly, without the involvement of the user. As noted above, failures of software may remain unnoticed by the user for an extended period. By monitoring telemetry generated by the software application, while the software application is running (e.g., as the telemetry is being generated), the technique may automatically discover and report failures of the software application to the provider of the software application. This arrangement permits failures of the software application to be reported and addressed by customer support personnel without delay.

In another aspect, the technique may reduce the time it takes customer support personnel to address a failure of the software application. When a particular log pattern matches telemetry data that is stored in any of the execution logs of the software application, the name of the log (and/or portion thereof), which matches the log pattern, may be reported to the service management system, thus decreasing the time it would take customer support personnel to review the execution logs of the software application.

In yet another aspect, the technique may reduce the time it takes customer support personnel to find the portion of the code of the software application, which contains a bug that is responsible for a failure of the software application. Each of the log patterns may be mapped to a respective component (or feature of the application), and it may represent a pattern that is expected to be manifested in the execution logs of the software application when the respective component (or feature of the software application) is experiencing a failure. Because each of the log patterns is associated with a specific software application component, a match between a log pattern and the telemetry data would also reveal the exact software application component that has failed. So, when a log pattern matches the telemetry data generated by the software application, the software application component associated with the log pattern may also be reported to the service management system, giving customer support personnel a better idea of where the software bug responsible for the failure is located.

According to the present disclosure, a failure of a software application (or a component of the software application) is when an unintended error, flaw, or fault in a set of processor-executable instructions, which are part of the software application, causes the software application to perform in an unintended manner or produce an unexpected result.

Figure 2:
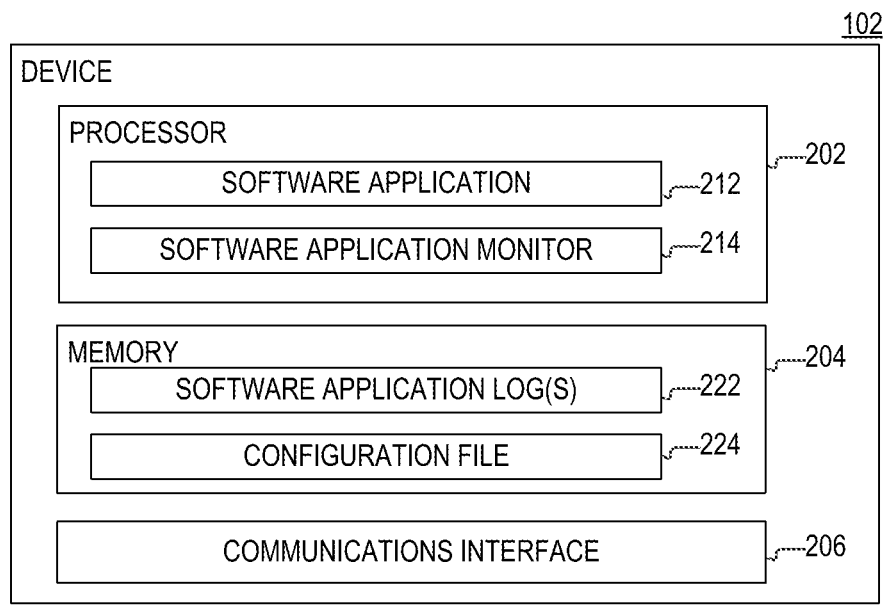
FIG. 2 is a diagram of an example of a computing device, according to aspects of the disclosure.

FIG. 1 is a diagram of an example of a system 100, according to aspects of the disclosure. As illustrated, the system 100 may include a plurality of computing devices 102 that are coupled to a service management system 104 via a communications network 106. The communications network 106 may include one or more of the Internet, a local area network (LAN), a wide area network (WAN), and/or any other suitable type of network. The service management system 104 may include one or more computing devices, such as the computing device 900, which is discussed further below with respect to FIG. 9. The service management system 104 may be configured to execute a monitor configuration file builder 105 (hereinafter "builder 105). The builder 105 may include software that is configured to generate a configuration file for a software application monitor that is running on each of the devices 102 (e.g., the monitor 214, which is shown in FIG. 2). The manner in which the configuration file is generated and used is discussed further below with respect to FIGS. 2-8.

FIG. 2 is a diagram of an example of a computing device 102, according to aspects of the disclosure. As the numbering suggests, the computing device 102 may be the same or similar to any of the devices 102A-C, which are discussed above with respect to FIG. 2. In some implementations, the computing device 102 may include a smartphone, a desktop computer, a laptop, and or any other user-end device. Additionally or alternatively, in some implementations, the computing device 102 may be a web server, a storage server, and/or any other component of a server farm and/or a distributed computing system.

The computing device 102 may include a processor 202, a memory 204, and a communications interface. The processor 202 may include one or of a general-purpose processor (e.g., an x86 processor or an ARM-based processor), an application-specific integrated circuit (ASIC), a field-programmable gate array (FPGA), and/or any other suitable type of processing circuitry. The memory 204 may include any suitable type of volatile or non-volatile memory, such as an Electrically Erasable programmable Read-Only Memory (EEPROM), a Synchronous Dynamic Random-Access Memory (SDRAM), a solid-state drive (SSD), a hard disk (HD). The communications interface 206 may include one or more of an Ethernet interface, a WiFi interface, a Universal Serial Bus interface, and/or any other suitable type of communications interface.

The processor 202 may be configured to execute a software application 212 and a software application monitor 214 (hereinafter "monitor 214). The memory 204 may be configured to store execution log(s) 222 (hereinafter "logs 222") and a configuration file 224. The software application 212 may include a website frontend (e.g., an e-commerce frontend), a website backend, a database server, a Kubernetes server, a web server, a word processor, spreadsheet software, inventory management software, and/or any other suitable type of software.

The log(s) 222 may include one or more logs that are generated by the software application 212 while the software application is executed. Any of the logs may identify one or more characteristics of the execution of the software application 212. By way of example, any of the logs may identify one or more of (i) user input that is received by the software application 212, (ii) communications that are received or transmitted by the software application 212, (iii) exceptions that are generated the software application 212, (iv) errors that are generated by the software application 212, (v) memory and/or other resource reservations that are made by the software application, etc.

The configuration file 224 may include one or more log patterns of the software application 212. At least some of the log patterns may correspond to a different type of failure of the software application 212. The monitor 214 may be executed concurrently with the software application 212. As the software application 212 is populating the log(s) 222 with data, the monitor may retrieve the data that is being streamed into the log(s) 222 (by the software application 212). The monitor 214 may compare the retrieved data to any of the log patterns (in the configuration file 224), which correspond to different types of failures of the software application 212. When the monitor 214 detects that any log pattern matches the data that is retrieved from the log(s) 222, the monitor 214 may report, to the service management system 104, that the software application 212 has malfunctioned. In some instances, the reporting may take place proactively, before the malfunction has become apparent to the user.

In some implementations, the application 212 and the monitor 214 may be installed on the computing device 102 by the service management system 104 or another entity. In some implementations, installation package(s) for the application 212 and the monitor 214 may be received concurrently at the computing device 102. Additionally or alternatively, in some implementations, the application 212 and the monitor 214 may be packaged in the same installation package. Executing the installation package may cause both the application 212 and the monitor 214 to be installed at once. The installation package may include binaries and other files for the application 212, binaries and other files for the monitor 214, and the configuration file 224. Thus in addition to containing binaries and other files for the application 212, the installation package may also contain a configuration file that is generated based on test logs that are produced over the course of testing the binaries (and/or source code that forms the binaries). Packaging the application 212, the monitor 214, and the configuration file 224 in the same installation package is advantageous because it enables exact matching between the current version of the application 212 and the log patterns that would be used by the monitor 214 to detect failures of the application 212.

Figures 3, 4:
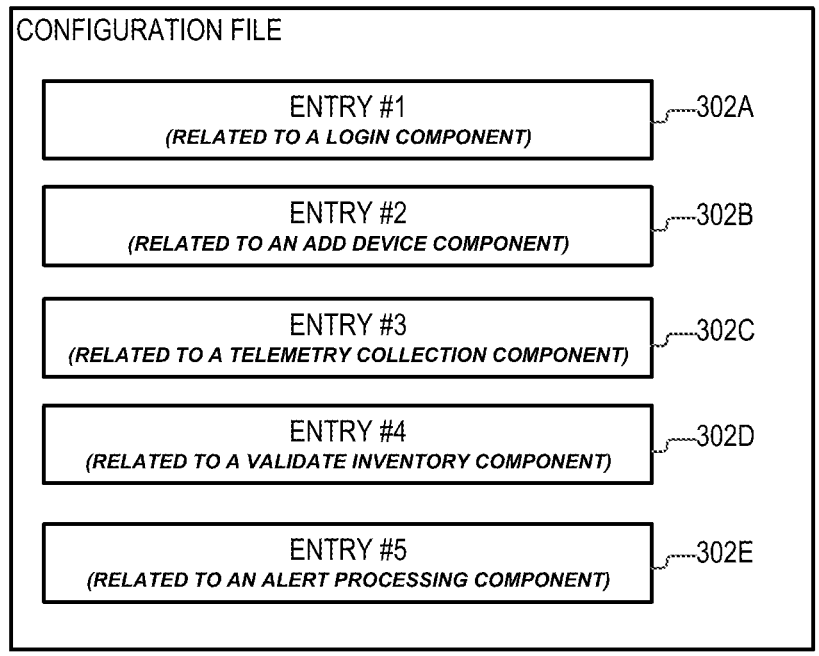
FIG. 3 is a diagram of an example of a configuration file, according to aspects of the disclosure.
FIG. 4 is a diagram of an example of a configuration file entry, according to aspects of the disclosure.

FIG. 3 shows an example of the configuration file 224 in further detail. As illustrated, the configuration file 224 may include a plurality of entries 302A-E. Each of the entries 302A-E may be associated with a different one of a plurality of components of the software application 212. For example, entry 302A may correspond to a login component of the software application 212; entry 302B may correspond to an add device component of the software application 212; entry 302C may correspond to a telemetry collection component of the software application 212; entry 302D may correspond to a validate inventory component of the software application 212; and entry 302E may correspond to an alert processing component of the software application 212.

As used throughout the disclosure, the phrase "component of a software application" may refer to one or more processor-executable instructions that are part of the software application, which implement a particular function or feature of the software program. For example, the login component of the software application 212 (which is associated with entry 302A) may implement functions of the software program 212 that relate to user login. The add device component of the software application 212 (which is associated with entry 302B) may implement functions of the software application 212 that relate to the addition of devices. The telemetry collection component of the software application 212 (which is associated with entry 302C) may implement functions of the software application 212 that relate to the collection of telemetry data. The validate inventory component of the software application 212 (which is associated with entry 302D) may implement functions of the software application 212 that relate to the monitoring of the inventory in a warehouse. The alert processing component of the software application 212 (which is associated with entry 302E) may implement functions of the software application 212 that relate to the processing of alerts that are received by the software application 212. Any of the components of the software application 212 may include at least one processor-executable instruction that is not part of any other component of the software application. Optionally, any of the components of the software application may also include a processor-executable instruction that is also part of (or shared with) another component of the software application 212. Any of the log patterns that are identified in the configuration file 224 may be integrated into the configuration file 224 or provided separately of the configuration file 224.

FIG. 4 shows an example of an entry 302. As the numbering suggests, entry 302 may be the same or similar to any of the entries 302A-E, which are discussed above with respect to FIG. 3.

According to the example of FIG. 4, entry 302 is associated with a respective component of the software application 212. As illustrated, entry 302 may include an identifier 402 that identifies the component of the software application 212, which log pattern(s) that are part of entry 302 are associated with (hereinafter "associated component").

Entry 302 may further include a plurality of lines 404. Each line 404 identifies: (i) respective portion of the associated component, (ii) one or more log patterns that are associated with the respective portion of the associated component, and (iii) and a condition corresponding to the one or more log patterns (e.g., a normal operating condition or a failure condition).

Line 404A indicates that a log pattern 23 is associated with a normal operating condition of a user interface of the associated component. When log pattern 23 is manifested in any of the log(s) 22, this is an indication that the user interface of the associated component is operating correctly.

Line 404B indicates that log patterns 28 and 30 are associated with a failure of the user interface of the associated component. When any of log patterns 28 and 30 is manifested in any of the log(s) 22, this is an indication that the user interface of the associated component is experiencing a failure.

Line 404C indicates that a log pattern 26 is associated with a normal operating condition of a background component of the associated component. When log pattern 26 is manifested in any of the log(s) 22, this is an indication that the background component is operating correctly.

Line 404D indicates that a log pattern 27 is associated with a failure of the background component. When log pattern 27 is manifested in any of the log(s) 22, this is an indication that the background component is experiencing a failure.

Line 404E indicates that a log pattern 25 is associated with a normal operating condition of "the rest of the associated component." When log pattern 25 is manifested in any of the log(s) 22, this is an indication that the "rest of the associated component" is operating correctly. The "rest of the associated component" may include all other portions of the associated component that are not explicitly identified in entry 302. In the present example, the "rest of the associated component" includes all other portions of the associated component, except for the user interface and the background component.

Line 404F indicates that log patterns 19 and 24 are associated with a failure of the "rest of the associated component." When any of log patterns 19 and 24 is manifested in any of the log(s) 22, this is an indication that the "rest of the associated component" is experiencing a failure.

Although in the example of FIG. 4, entry 302 associates log pattern with specific portions of a software application component, alternative implementations are possible in which a log pattern that is listed in the entry 302 corresponds to a normal (or failed operation) of the entire software application component, rather than a specific portion thereof. In other words, in some implementations, entry 302 may have a higher level of granularity than what is shown in FIG. 4.

FIG. 5A is a diagram of an example of a failure log pattern 500A, according to aspects of the disclosure. As used throughout the disclosure, the term "failure pattern" refers to a log pattern that is generated and/or manifested in the log(s) 222 when the software application 212 is experiencing a failure. Examples of failure log patterns in FIG. 4 include log patterns 19, 24, 27, 28, and 30. As illustrated in FIG. 5A, the log pattern 500A identifies a sequence of actions that are taken by the software application 212 and the outcome of at least one of the actions. In the example of FIG. 5A, the log pattern 500A indicates that the sequence has failed to complete successfully.

FIG. 5B is a diagram of an example of a success log pattern 500B, according to aspects of the disclosure. As used throughout the disclosure, the term "success log pattern" refers to a log pattern that is generated and/or manifested in the log(s) 222 when the software application 212 is operating correctly. Examples of failure log patterns in FIG. 4 include log patterns 23, 26, and 25. As illustrated in FIG. 5B, the log pattern 500B identifies a sequence of actions that are taken by the software application 212 and the outcome of at least one of the actions. In the example of FIG. 5B, the log pattern 500B indicates that the sequence has been completed successfully.

As used throughout the disclosure, the term "log pattern" may refer to a data structure (or portion thereof), which identifies one or more of: (i) one or more actions that are performed by a software application (or portion thereof), (ii) one or more errors that are generated by the software application (or portion thereof), (iii) one or more exceptions that are generated by the software application (or portion thereof), (iv) one or more execution traces that are generated by the software application (or portion thereof), of (v) user input that is received by the software application 212, (vi) communications that are received or transmitted by the software application 212. Although in the example of FIGS. 5A-B the log patterns are represented as text, it will be understood that alternative implementations are possible in which any of the log patterns 500A and 500B is represented as a vector. Stated succinctly the present disclosure is not limited to any specific method for representing log patterns.

In some implementations, any of the log patterns in the configuration file 224 may be generated based on one or more test logs that are generated over the software development cycle of the software application 212. A test log of the software application 212 may include any log that is generated during the testing the software application 212. For example, in some implementations, a test log of the software application 212 may include a log that is generated by the software application 212 while the software application 212 is being tested. In such implementations, the test log may have the same format and/or syntax as any of the log(s) 222. Additionally or alternatively, in some implementations, a test log of the software application may include a log that is generated by other software used to test the software application 212, such as a debugger or test manager (e.g., Quality Center™, etc.).

FIG. 6A shows an example of a test log 600A that is used as a basis for generating the log pattern 500A. As illustrated, the test log 600A may include a plurality of phrases 602. The phrases 602, as illustrated in FIG. 5A, are also constituent elements of the log pattern 500A. FIG. 6A illustrates that, in some implementations, the log pattern 500A may include a group of words and phrases that are found in the test log 600A. In some implementations, the group of words or phrases, which constitutes the log pattern 500A, may be generated by filtering the test log 600A in accordance with standard natural language processing (NLP) techniques. Additionally or alternatively, in some implementations, the group of words or phrases, which constitutes the log pattern 500A, may be generated by filtering the test log 600A in accordance with the process 800, which is discussed further below with respect to FIG. 8.

FIG. 6B shows an example of a test log 600B that is used as a basis for generating the log pattern 500B. As illustrated, the test log 600B may include a plurality of phrases 604, which also form the log pattern 500B. FIG. 6A illustrates that, in some implementations, the log pattern 500B may include a group of words and phrases that are found in the test log 600B. In some implementations, the group of words or phrases, which constitutes the log pattern 500B, may be generated by filtering the test log 600B in accordance with standard natural language processing (NLP) techniques. Additionally or alternatively, in some implementations, the group of words or phrases, which constitutes the log pattern 500B, may be generated by filtering the test log 600B in accordance with the process 800, which is discussed further below with respect to FIG. 8.

Figure 7:
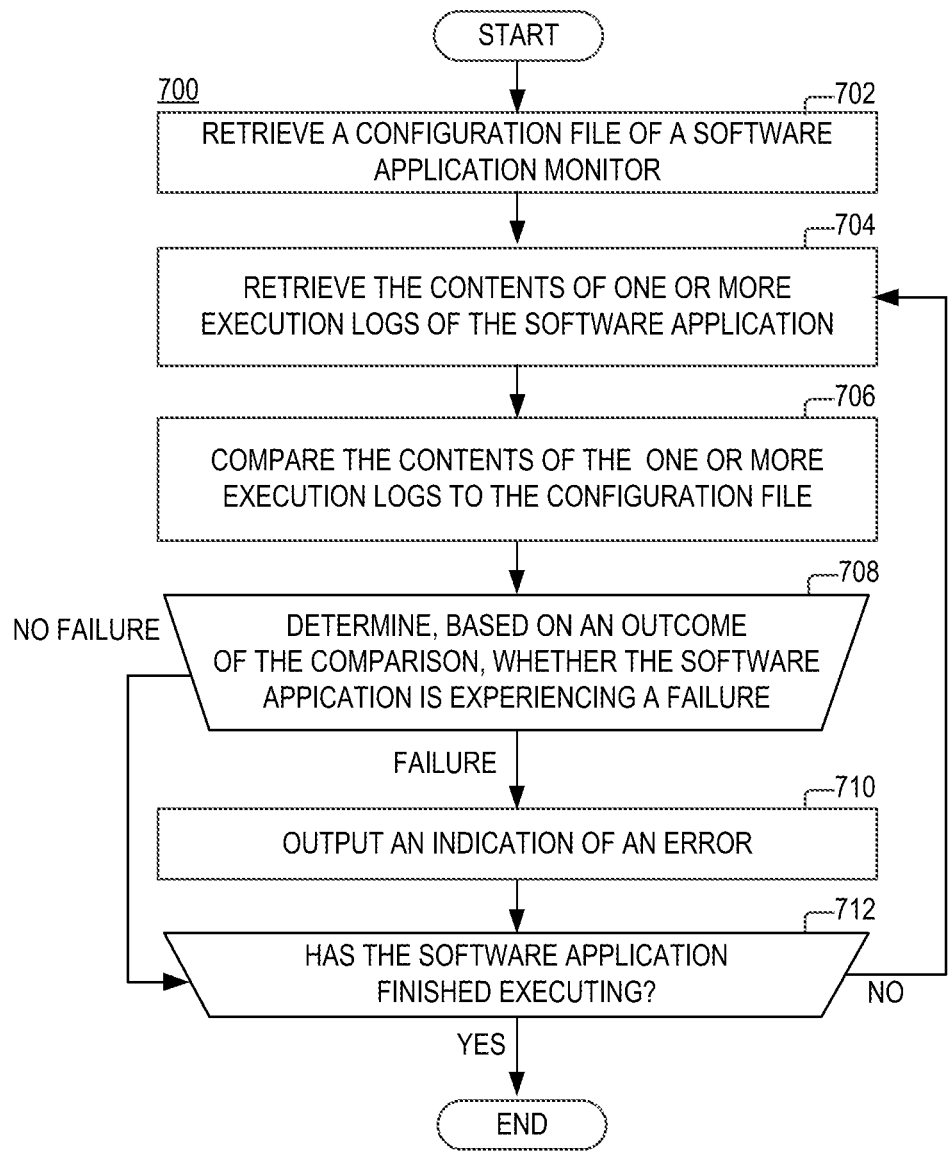
FIG. 7 is a flowchart of an example of a process, according to aspects of the disclosure.

FIG. 7 is a flowchart of an example of a process 700, according to aspects of the disclosure. At step 702, the monitor 214 retrieves the configuration file 224. In some implementations, retrieving the configuration file 224 may include retrieving at least one (or every) log pattern (e.g., a failure log pattern) that is identified in the configuration file. At step 704, the monitor 214 retrieves at least a portion of the contents of log(s) 222. At step 706, the monitor 214 compares the configuration file 224 to the retrieved contents of the log(s) 222. In some implementations, comparing the configuration file 224 to the the retrieved contents of the log(s) 222 may include detecting whether any of the log patterns identified in the configuration file 224 is manifested in at least one of the log(s) 222. At step 708, the monitor 214 detects (based on the outcome of the comparison performed at step 706) whether the software application 212 is experiencing a failure. For example, if at least one log failure log pattern that is identified in the configuration file 224 is manifested in the log(s) 222, the monitor 214 may determine that the software application 212 is experiencing a failure. On the other hand, if the none of the failure log patterns that are identified in the configuration file 224 is manifested in the log(s) 222, the monitor 214 may determine that the software application 212 is not experiencing a failure. If the monitor 214 determines that the software application 212 is experiencing a failure, the process 700 proceeds to step 710. Otherwise, if the monitor 214 determines that the software application 212 is not experiencing a failure, the process 700 proceeds to step 712. At step 710, the software application outputs an indication of an error. At step 712, the monitor 214 detects whether the execution of the software application 212 has terminated. If the execution of the software application has terminated, the process 700 ends. Otherwise, if the software application 212 continues to execute, the process 700 returns to step 704.

In some implementations, outputting the indication of an error (at step 710) may include transmitting to the service management system 104 a message indicating that the software application 212 is experiencing a failure. The message may include one or more of: (i) an identifier of a failing log pattern that is manifested in at least one of the log(s) 222, (ii) an identifier of a component of the software application that is associated with the failing log pattern, (iii) an identifier of a log (or a specific portion of a log), in which the failing log pattern is manifested. The identifier of the failing log pattern and/or the identifier of the associated component of the software application may be retrieved from an entry 302 in the configuration file 224 that contains (e.g., identifies, etc.) the failing log pattern.

In some implementations, the process 700 may be performed concurrently with the execution of the software application 212. While the software application 212 is executing, it may continue to populate the log(s) 222 with new content. In this regard, each subsequent iteration of steps 704-708 may be executed based on new content, which has been added to the log(s) 222 after the most recent execution of step 704. Repeatedly executing steps 704-708 enables the monitor 214 to determine whether any new content has been added to the log(s) 222, which indicates that the application is experiencing a failure.

According to the present disclosure, a given log pattern is manifested in the log(s) 222 if any of the log(s) 222 includes a pattern that is the same as (or otherwise matches) the given log pattern. As noted above, a given log pattern may identify a sequence of actions, execution traces, errors, and/or exceptions. In this regard, the log(s) 222 may match the log pattern when the log(s) 222 identify the same (or similar) sequence of actions, execution traces, errors, and/or exceptions. It will be understood that the present disclosure is not limited to any specific method for comparing a log pattern to log(s) 222.

Figure 8:
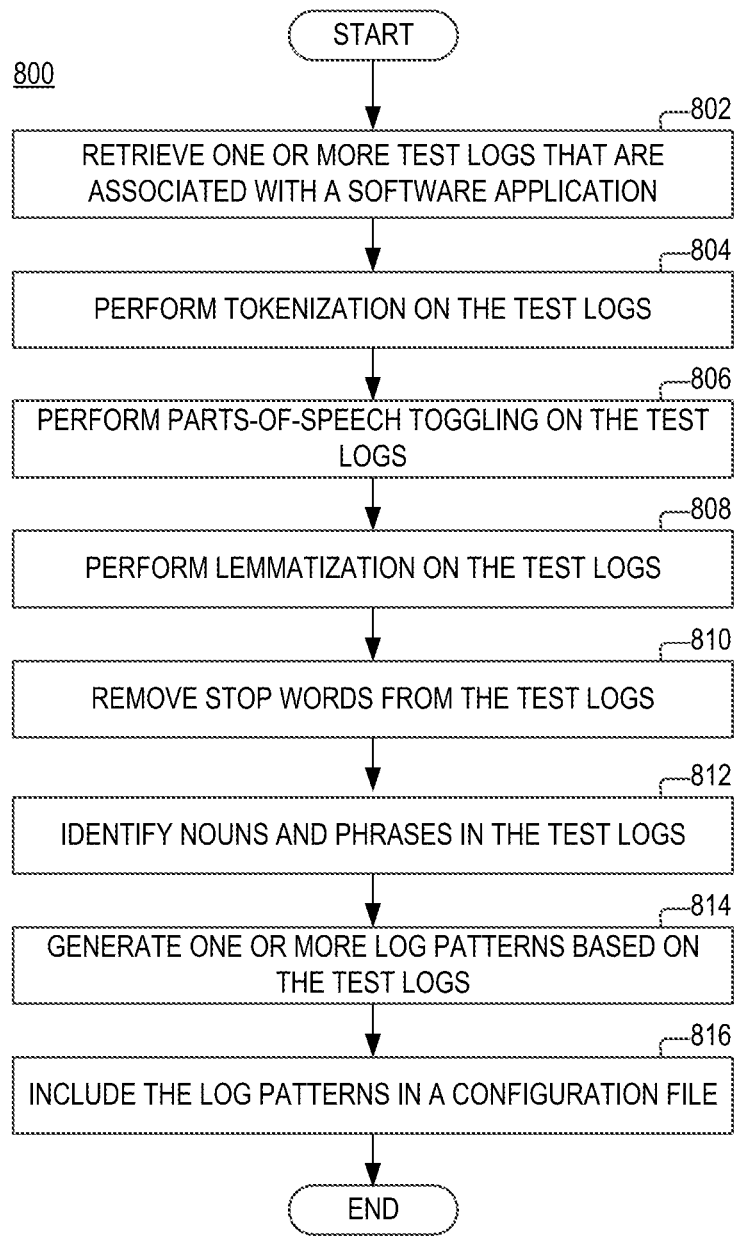
FIG. 8 is a flowchart of an example of a process, according to aspects of the disclosure.

FIG. 8 is a flowchart of an example of a process 800 for generating a configuration file, according to aspects of the disclosure. At step 802, the builder 105 receives one or more test logs that have been generated over the course of testing the software application 212. At step 804, the builder 105 performs tokenization on the one or more test logs. At step 806, the builder 105 performs parts-of-speech toggling on the one or more test logs. At step 808, the builder 105 performs lemmatization on the one or more test logs. At step 810, the builder 105 performs stop word removal on the one or more test logs. At step 812, the builder 105 identifies predetermined nouns and phrases that are part of the test logs. At step 814, the builder 105 generates one or more log patterns that are identified in the log files by performing named entity recognition and/or conference resolution on the test logs. Performing named entity recognition on the test logs may include classifying entities in the test logs into pre-defined categories. An entity category may include an identifier of an application component, such as the identifier 402, and an entity may refer to an identifier of a portion of the application component. Performing conference resolution on the text logs may include finding all (or at least some) of the expressions (e.g., nouns and phrases) in the text that refer to the same entity (or entity category) in the test logs. At step 816, the builder 105 instantiates the configuration file 224 and inserts the log patterns (generated at step 814) into the configuration file 224.

Referring to FIG. 9, computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-9 are provided as an example only. At least some of the steps discussed with respect to FIGS. 1-9 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
    receiving a configuration file that identifies a plurality of first log patterns, the configuration file being arranged to identify a respective component of an application that is associated with each of the plurality of first log patterns, at least one of the first log patterns identifying a sequence of actions that are taken by the application and an outcome of the sequence of actions;
    retrieving, by an application monitor, one or more execution logs that are generated while the application is being executed;
    identifying, by the application monitor, a malfunction of the application based on the configuration file and the one or more execution logs, the malfunction being identified in response to a given one of the plurality of first log patterns matching an execution log pattern that is identified in the one or more execution logs; and
    reporting, by the application monitor, the malfunction to a technical support system,
    wherein reporting the malfunction to the technical support system includes retrieving, from the configuration file, an identifier of a component of the application that is associated with the given one of the plurality of first log patterns and transmitting the retrieved identifier to the technical support system, and
    wherein the application monitor is executed concurrently with the application on a same computing device, and the malfunction of the application is identified and reported while the application is being executed.

2. The method of claim 1, wherein the configuration file further identifies a plurality of second log patterns, each of the second log patterns being associated with a respective component of an application and a respective normal operational state of the respective component of the application.

3. The method of claim 1, wherein reporting the malfunction includes transmitting to the technical support system an identifier of the respective component of the application that is associated with the given one of the plurality of first log patterns.

4. The method of claim 1, wherein the application monitor is configured to iteratively compare the one or more execution logs of the application to the configuration file, as the one or more execution logs of the application are being updated over the course of execution of the application.

5. The method claim 1, wherein the plurality of first logs is generated by processing one or more test logs that are generated during a testing of the application.

6. The method of claim 1, the configuration file is received concurrently with an executable file for the application.

7. The method of claim 6, wherein the executable file for the application and the configuration file are packaged together.

8. A system, comprising:
a memory; and
at least one processor operatively coupled to the memory, the at least one processor being configured to perform the operations of:
receiving a configuration file that identifies a plurality of first log patterns, the configuration file being arranged to identify a respective component of an application that is associated with each of the plurality of first log patterns, at least one of the first log patterns identifying a sequence of actions that are taken by the application and an outcome of the sequence of actions;
retrieving, by an application monitor, one or more execution logs that are generated while the application is being executed;
identifying, by the application monitor, a malfunction of the application based on the configuration file and the one or more execution logs, the malfunction being identified in response to a given one of the plurality of first log patterns matching an execution log pattern that is identified in the one or more execution logs; and
reporting, by the application monitor, the malfunction to a technical support system,
wherein reporting the malfunction to the technical support system includes retrieving, from the configuration file, an identifier of a component of the application that is associated with the given one of the plurality of first log patterns and transmitting the retrieved identifier to the technical support system, and
wherein the application monitor is executed concurrently with the application on a same computing device, and the malfunction of the application is identified and reported while the application is being executed.

9. The system of claim 8, wherein the configuration file further identifies a plurality of second log patterns, each of the second log patterns being associated with a respective component of an application and a respective normal operational state of the respective component of the application.

10. The system of claim 8, wherein reporting the malfunction includes transmitting to the technical support system an identifier of the respective component of the application that is associated with the given one of the plurality of first log patterns.

11. The system of claim 8, wherein the application monitor is configured to iteratively compare the one or more execution logs of the application to the configuration file, as the one or more execution logs of the application are being updated over the course of execution of the application.

12. The system of claim 8, wherein the plurality of first logs is generated by processing one or more test logs that are generated during a testing of the application.

13. The system of claim 8, the configuration file is received concurrently with an executable file for the application.

14. The system of claim 13, wherein the executable file for the application and the configuration file are packaged together.

15. A non-transitory computer-readable storage medium that is configured to store one or more processor-executable instructions, which when executed by at least one processor cause the at least one processor to perform the operations of:
receiving a configuration file that identifies a plurality of first log patterns, the configuration file being arranged to identify a respective component of an application that is associated with each of the plurality of first log patterns, at least one of the first log patterns identifying a sequence of actions that are taken by the application and an outcome of the sequence of actions;
retrieving, by an application monitor, one or more execution logs that are generated while the application is being executed;
identifying, by the application monitor, a malfunction of the application based on the configuration file and the one or more execution logs, the malfunction being identified in response to a given one of the plurality of first log patterns matching an execution log pattern that is identified in the one or more execution logs; and
reporting, by the application monitor, the malfunction to a technical support system,
wherein reporting the malfunction to the technical support system includes retrieving, from the configuration file, an identifier of a component of the application that is associated with the given one of the plurality of first log patterns and transmitting the retrieved identifier to the technical support system, and
wherein the application monitor is executed concurrently with the application on a same computing device, and the malfunction of the application is identified and reported while the application is being executed.

16. The non-transitory computer-readable storage medium of claim 15, wherein the configuration file further identifies a plurality of second log patterns, each of the second log patterns being associated with a respective component of an application and a respective normal operational state of the respective component of the application.

17. The non-transitory computer-readable storage medium of claim 15, wherein reporting the malfunction includes transmitting to the technical support system an identifier of the respective component of the application that is associated with the given one of the plurality of first log patterns.

18. The non-transitory computer-readable storage medium of claim 15, wherein the application monitor is configured to iteratively compare the one or more execution logs of the application to the configuration file, as the one or more execution logs of the application are being updated over the course of execution of the application.

19. The non-transitory computer-readable storage medium of claim 15, wherein the plurality of first logs is generated by processing one or more test logs that are generated during a testing of the application.

20. The non-transitory computer-readable storage medium of claim 15, the configuration file is received concurrently with an executable file for the application.

* * * * *